Patented Nov. 2, 1943

2,333,265

UNITED STATES PATENT OFFICE 2,333,265

RUBBER PRODUCT AND METHOD OF PRO-
DUCING SAME

Alan Henry McIntosh and Harry Edward Pfaff,
Hamilton, Ontario, Canada

No Drawing. Application September 13, 1940,
Serial No. 356,668

4 Claims. (Cl. 260—742)

This invention relates to improvements in methods of treating rubber latex, and has for its primary object the production of novel and improved forms of rubber composition articles. Another object of the invention is to produce a novel diffusion of water effect in natural and/or modified rubber latex to provide a novel rubber composition product which is stable and of substantially increased bulk and covering ability compared to the rubber content thereof in its previous state. Another object of the invention is to provide a novel rubber composition product which is capable of improved fabric priming and coating performance. Further objects and advantages of the invention will appear from the specification herein. This application is a continuation in part of our co-pending application Serial No. 284,705 filed July 15, 1939.

Usual methods of treating rubber latex in connection with the preparation of useful rubber composition articles generally involve extraction of portions of the natural water content from the latex through utilization of the tendency of the latex to separate into component parts during a so-called "creaming" process. As distinguished from the above, the present invention involves no removal of the original water content from the latex but does involve the adding of additional quantities of water thereinto in perfectly diffused form to produce a novel form of rubber composition which is of increased bulk and stable and not susceptible to coagulation and/or separation by "creaming" processes.

In carrying out our invention we first provide a diffusing solution by preparing an aqueous dispersion of a suitable vegetable gum having the characteristics, for the purpose employed, of gum tragacanth. The diffusing solution is diluted to desired form by addition of water, and the filler ingredient, if any is to be used in the composition of the product is admixed thereinto. This preparation is then admixed into either raw or precured latex, and the composition is ready to be sprayed or brushed or poured or otherwise applied to the surfaces prepared for its reception. If the latex used is of the precured variety; that is, having vulcanizing agents included in its make-up, the composition will set up immediately upon application. However, if the latex used is of the raw untreated type a subsequent vulcanizing process will be applied to the composition to stabilize the rubber content thereof.

The novel rubber composition so produced is substantially stable and will not coagulate or separate in bulk, and thus remains for long periods of time in proper condition for spraying or brushing or other methods of application. If it is compounded of the pre-vulcanized type of latex it will set up immediately upon being so applied at ordinary temperatures, although under increased temperatures the speed of the setting will be increased. No pressure is required in this connection and the resultant product is exceedingly flexible; has comparatively great tensile strength; will not check or craze; and will retain these qualities without deterioration for long periods of time. The water diffusion process of the invention, however, may also be effected in connection with raw latex prior to the inclusion therein of ingredients necessary to subsequently produce vulcanization; and it will be understood that in either case the novel diffused latex of the invention will be stable and otherwise improved as to form for the purposes intended.

We have found by extensive experiment that the steps in our process must be carried out in proper sequence to give the desired results and we will now describe such process more particularly as well as give typical formulae.

We first prepare the diffusion agent, as by placing a small quantity of gum tragacanth in a comparatively large quantity of distilled water. We find that substantially ¼ oz. of gum tragacanth to substantially 2 qts. (4 lbs.) of distilled water is suitable (Formula A).

We then mix ⅛th of an ounce of Formula A with a further comparatively large quantity of distilled water. Substantially 6 to 8 drops of Formula A to substantially 1 qt. (2 lbs.) of distilled water is suitable (Formula B).

We then mix 2 lbs. of some suitable filler, such as asbestos flour or the like, with 2 lbs. of Formula B. If it is desired that the product be colored, suitable color pigments may be added to this mix according to the color and tint desired (Formula C).

We then pour the product of Formula C into 2 lbs. of pre-cured or vulcanized latex, and mix (Formula D).

Where Formula D is to be applied to fabrics we find it of advantage to employ a wetting solution to be applied to such fabrics prior to the application of Formula D; or said wetting solution can be included in Formula D for direct application if desired. This wetting solution is in itself a high grade waterproofing and windproofing material where a cheaper and lighter rubber covering is desired. Such wetting solution is preferably brushed into the fabric and may consist of a small quantity of trisodium phosphate or magnesium sulphate dissolved in a comparatively large quantity of distilled water to which a substantially equal quantity by weight of pre-cured or vulcanized latex is added and mixed. A wetting solution consisting of from one-half (½) ounce to one (1) ounce of trisodium phosphate (or magnesium sulphate) dissolved in four (4) pounds of distilled water to which is added and mixed four (4) pounds of pre-cured or vulcanized latex is suitable. When our wetting solution is employed the trisodium phosphate (or magnesium sulphate) acts as a fibre expanding agent, enabling the composition to effectively anchor itself thereto and effectively covering the surface of such fibres and the fabric itself.

An important advantage of our composition is that the former can be cheaply produced and the latter very inexpensively carried out, as the ingredients employed are readily obtainable and no costly equipment or machinery is necessary. In fact in many applications the necessary equipment can be taken directly onto the job thus eliminating the need of separate plant and plant equipment.

Our composition can be employed for manufacturing sheet rubber; the rubberizing of fabrics of all kinds in colors and to other materials in the form of paint; either by spray gun or brush methods of application. Heavy duty rubber of any thickness or desired shape and using inexpensive fillers such as wood fibres, etc., and applicable to many uses can be produced by simply mixing the composition cold and trowelling it into form, then allowing it to set without application of heat or pressure. This latter type of material is particularly adaptable for flexible one-piece molds, as they require no plaster of Paris cases for support.

It will be understood that compositions of the invention may be compounded of ingredients other than those specifically named in the hereinabove examples. For instance, in lieu of gum tragacanth, any other suitable form of vegetable gum having the necessary characteristics for the purpose of providing diffusion of additional water into the rubber latex ingredient may be employed. Also, in lieu of the use of asbestos as a filler ingredient, other suitable fillers such as clays, chalks, magnesium carbonate, zinc oxide, lamp black, wood fibres, ground leather, ground rubber, cork, vermiculite, or the like may be employed. In lieu of the trisodium phosphate or magnesium sulphate wetting agents, as hereinabove described, any other suitable form of fibre expanding or wetting agent may be employed for the purpose explained hereinabove such as borax, for example, and although the invention has been described herein chiefly by way of example it will be understood that it is not so limited but that various changes may be made therein without departing from the spirit of the invention or the scope of the appended claims.

We claim:

1. A rubber composition according to the following formula:

2 lbs. of pre-cured substantially 60–40 rubber latex; 1 qt. (2 lbs.) distilled water to which has been previously added ⅛ oz. of a vegetable rubber latex-water diffusing agent composed of a gum solution consisting of ¼ oz. gum dissolved in 2 qts. (4 lbs.) distilled water.

2. A rubber composition according to the following formula:

2 lbs. of pre-cured substantially 60–40 rubber latex; 1 qt. (2 lbs.) distilled water to which has been previously added ⅛ oz. of a vegetable rubber latex-water diffusing agent composed of a gum tragacanth solution consisting of ¼ oz. gum tragacanth dissolved in 2 qts. (4 lbs.) distilled water; and the required quantity of filler.

3. In a process for producing a stabilized water diffused rubber composition, the steps which consist in dissolving substantially ¼ oz. of gum tragacanth in 2 qts. (4 lbs.) of distilled water, adding ⅛ oz. of such solution to substantially 1 qt. (2 lbs.) of distilled water to form a very diluted solution, and adding a quart of the diluted solution to substantially 2 lbs. of pre-cured substantially 60–40 rubber latex.

4. In a process for producing a stabilized water diffused rubber composition, the steps which consist in dissolving substantially ¼ oz. of gum tragacanth in 2 qts. (4 lbs.) of distilled water, adding ⅛ oz. of such solution to substantially 1 qt. (2 lbs.) of distilled water to form a very diluted solution, adding to this solution 2 lbs. of filler and adding the mixture so obtained to substantially 2 lbs. of pre-cured approximately 60–40 rubber latex.

ALAN HENRY McINTOSH.
HARRY EDWARD PFAFF.